(12) United States Patent
Jamjoom et al.

(10) Patent No.: US 9,792,576 B1
(45) Date of Patent: Oct. 17, 2017

(54) OPERATING A PLURALITY OF DRONES AND TRUCKS IN PACKAGE DELIVERY

(71) Applicant: International Business Machines Corporation, Armonk, NY (US)

(72) Inventors: Hani T. Jamjoom, Cos Cob, CT (US); David M. Lubensky, Brookfield, CT (US); Justin G. Manweiler, Somers, NY (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/331,989

(22) Filed: Oct. 24, 2016

(51) Int. Cl.
*G06F 17/30* (2006.01)
*G06Q 10/08* (2012.01)
*B64C 39/02* (2006.01)
*G05D 1/10* (2006.01)

(52) U.S. Cl.
CPC ....... *G06Q 10/0832* (2013.01); *B64C 39/024* (2013.01); *G05D 1/104* (2013.01); *G06F 17/30* (2013.01); *B64C 2201/128* (2013.01); *B64C 2201/208* (2013.01)

(58) Field of Classification Search
CPC .............. B64C 39/024; B64C 2201/14; B64C 2201/141; B64C 2201/145; B64C 2201/126; B64C 2201/128; G06Q 10/0832; G06Q 10/08355
See application file for complete search history.

(56) References Cited

U.S. PATENT DOCUMENTS

| | | | |
|---|---|---|---|
| 6,795,823 B1 * | 9/2004 | Aklepi | G06Q 10/08 707/781 |
| 9,244,147 B1 | 1/2016 | Soundararajan et al. | |
| 9,619,776 B1 * | 4/2017 | Ford | G06Q 10/08355 |
| 2014/0032034 A1 | 1/2014 | Raptopoulos et al. | |
| 2014/0164126 A1 | 6/2014 | Nicholas et al. | |
| 2015/0317597 A1 | 11/2015 | Shucker et al. | |
| 2016/0107750 A1 * | 4/2016 | Yates | B64C 39/024 244/2 |

* cited by examiner

*Primary Examiner* — Brian M O'Hara
(74) *Attorney, Agent, or Firm* — Scully, Scott, Murphy & Presser, P.C.; Daniel P. Morris

(57) ABSTRACT

Controlling drones and vehicles in package delivery, in one aspect, may include routing a delivery vehicle loaded with packages to a dropoff location based on executing on a hardware processor a spatial clustering of package destinations. A set of drones may be dispatched. A drone-to-package assignment is determined for the drones and the packages in the delivery vehicle. The drone is controlled to travel from the vehicle's dropoff location to transport the assigned package to a destination point and return to the dropoff location to meet the vehicle. The delivery vehicle may be alerted to speed up or slow down to meet the drone at the return location, for example, without the delivery vehicle having to stop and wait at the dropoff location while the drone is making its delivery.

20 Claims, 4 Drawing Sheets

OPERATING A PLURALITY OF DRONES AND TRUCKS IN PACKAGE DELIVERY

FIELD

The present application relates generally to operations of a drone and, more particularly to operating a plurality of drones and trucks in package delivery.

BACKGROUND

Drones are small, lightweight aerial vehicles that are operated either autonomously by onboard computers or by a human operator via remote control. For autonomous flight, drones contain a global positioning system (GPS) device that guides them along a sequence of waypoints and enables them to return to their launching point. Drones may carry payloads, such as sensor packages, cameras, or other types of small objects. The flight time of a drone is a function of its weight, battery capacity, and operating environment such as wind. Flight times generally range from 10 to 15 minutes per battery for helicopter drones and 30 to 50 minutes for fixed-wing drones.

Drones are becoming increasingly popular in the hobbyist/consumer market. Interest in the commercial use of drones is also increasing, as new regulations in the U.S. are being crafted to enable commercial drone flights. Industries that drones may impact may include agriculture, cinematography, mining, oil and gas, emergency response, and law enforcement.

BRIEF SUMMARY

A method and system of controlling drones and vehicles in package delivery are provided. The method, in one aspect, may include routing a delivery vehicle loaded with packages to a dropoff location based on executing on a hardware processor a spatial clustering of package destinations, The method may also include dispatching drones with the delivery vehicle. The method may also include configuring a drone to package assignment for the drones in the vehicle and the packages in the delivery vehicle. In one aspect, the configuring is performed based on executing on the hardware processor, an optimization problem that maximizes a number of the packages delivered by the drones subject to a plurality of constraints comprising. The optimization problem is given as input at least the dropoff location. The plurality of constraints may include at least that a given package can only be delivered one time by one drone, that weight of the given package must not exceed capacity of the drone, and that for a single drone, a combined distance from the delivery vehicle to a first delivery plus a distance between each delivery, must not exceed a battery life of the drone subject to current wind conditions in drone's delivery path. The method may also include controlling the drone to travel from the dropoff location to transport the assigned package to a destination point and return to the dropoff location to meet the vehicle.

A system of controlling drones and vehicles in package delivery, in one aspect, may include a hardware processor operable to control routing of a delivery vehicle loaded with packages to a dropoff location based on executing a spatial clustering of package destinations. The hardware processor may be operable to dispatch drones with the delivery vehicle. The hardware processor may be operable to configure a drone to package assignment for the drones and the packages in the delivery vehicle, the configuring performed based on executing on the hardware processor an optimization problem that maximizes a number of the packages delivered by the drones subject to a plurality of constraints comprising, the optimization problem given as input at least the dropoff location and the plurality of constraints comprising at least that a given package can only be delivered one time by one drone, that weight of the given package must not exceed capacity of the drone, and that for a single drone, a combined distance from the delivery vehicle to a first delivery plus a distance between each delivery, must not exceed a battery life of the drone subject to current wind conditions in drone's delivery path. The hardware processor may be operable to control a drone to travel from the dropoff location to transport the assigned package to a destination point and return to the dropoff location to meet the vehicle.

A computer readable storage medium and/or device storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system and method are disclosed for dispatching unmanned aerial vehicles (UAVs), also referred to as drones, to provide a truck-to-door package delivery service. A set of vehicles carrying a set of packages drive around different service areas, for example, neighborhoods in a city. Drones are dispatched to pick up a package from a truck or like transport or moving medium, and deliver the package to its destination, for example, a home or office. After delivery, drones may return to a different vehicle to recharge the drones or pick up a new package. The system in one embodiment is designed to enable delivery trucks or the like to circle around neighborhoods without having to stop and park, avoiding possible compliance issues with local parking regulations, for example, avoiding parking tickets for stopping while making a delivery. In one embodiment, the system and method use one or more optimization techniques to produce a schedule of which drones deliver which packages from which trucks, and the route trucks should follow.

In one embodiment, the system and method create an assignment between packages and delivery UAVs that optimizes for distance, UAV battery life, package weight and UAV capacity, and location of the delivery trucks. The system and method in one embodiment assigns packages to delivery UAVs considering incorporation of moving ground stations, for example, delivery trucks.

Figure 1:
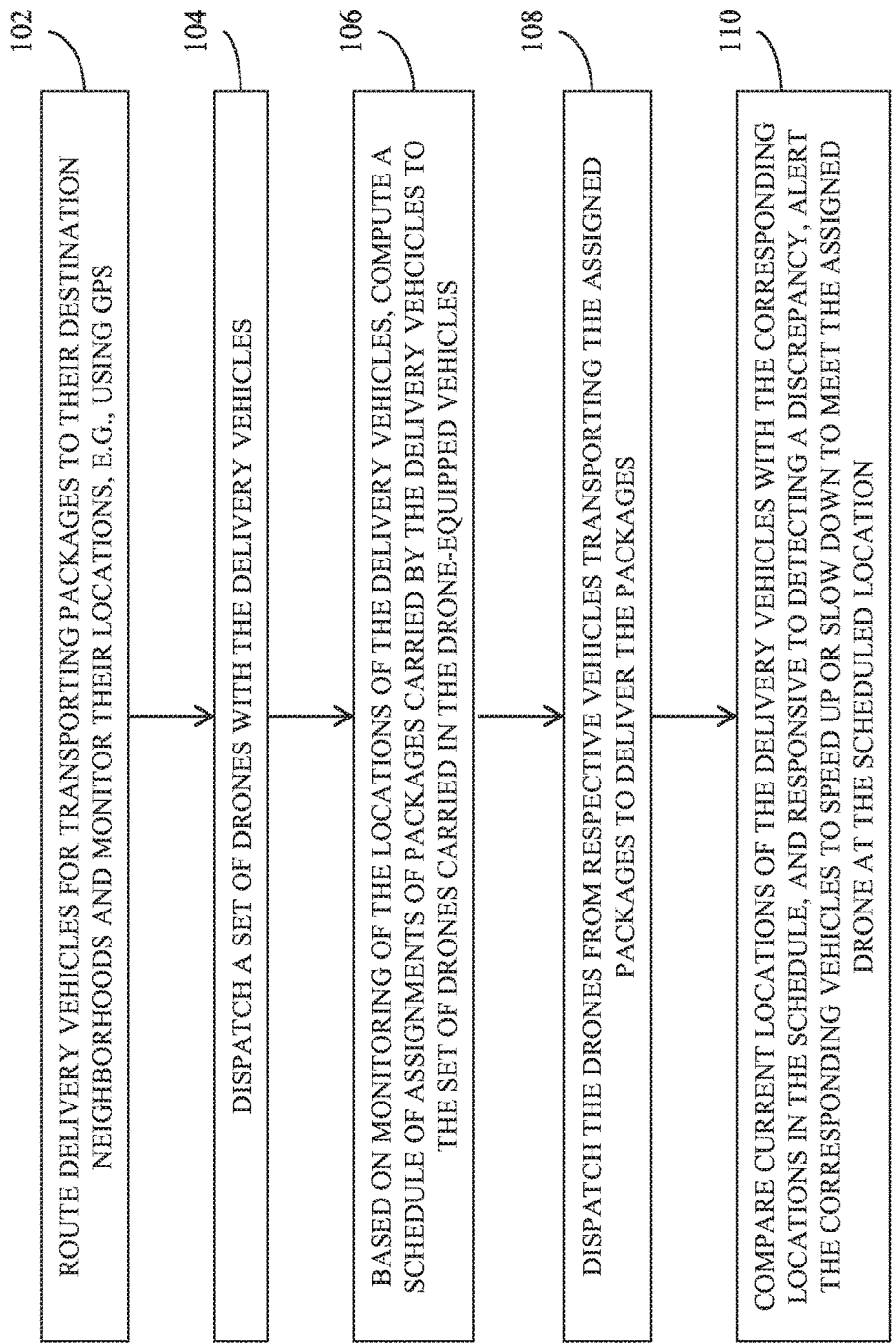
FIG. 1 is a diagram illustrating a method of operating unmanned aerial vehicles (UAVs) or drones in one embodiment of the present disclosure.
Figure 4:
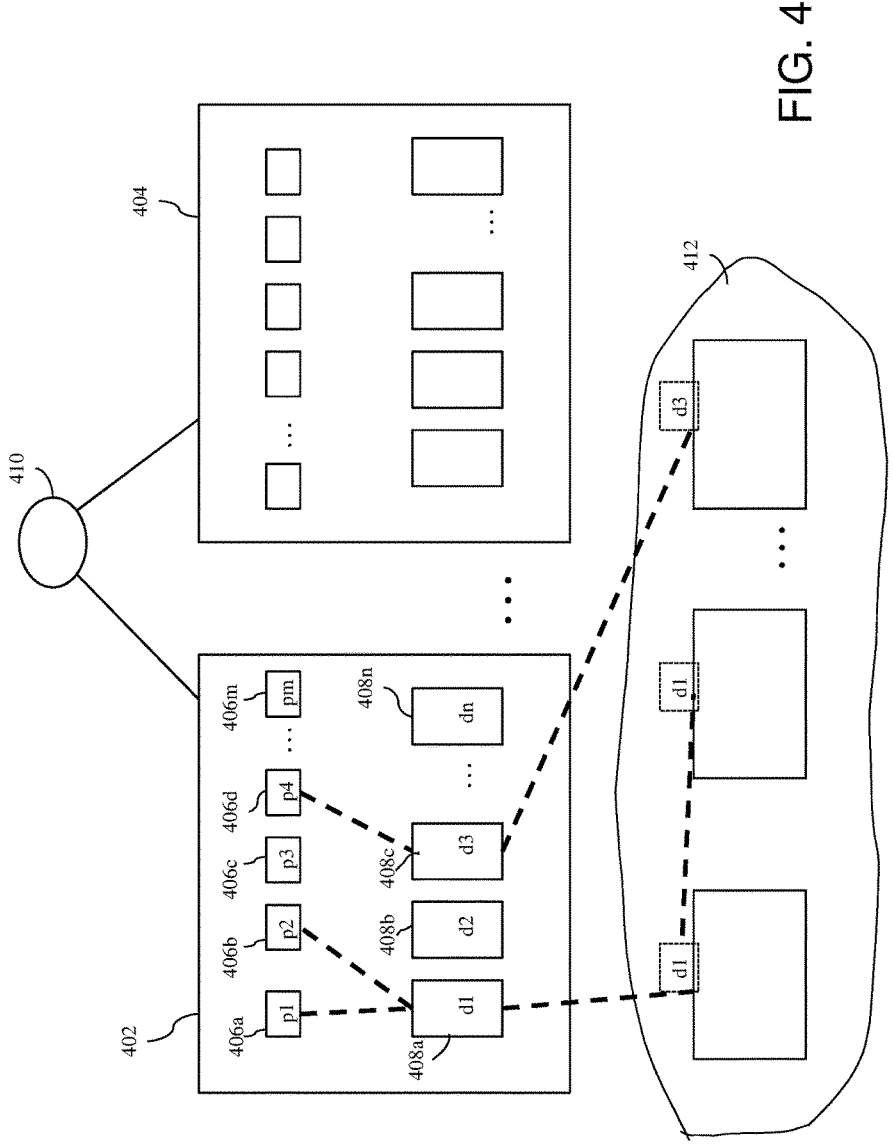
FIG. 4 illustrates example delivery vehicle with drones and packages in one embodiment of the present disclosure.

FIG. 1 is a diagram illustrating a method of operating unmanned aerial vehicles (UAVs) or drones in one embodiment of the present disclosure. At 102, a set of delivery trucks (e.g., FIG. 4 at 402, 404) is loaded with packages (e.g., FIG. 4 at 406a, 406b, 406c, 406d, 406m) based on a spatial clustering of package destinations, for example, at a warehouse. Delivery trucks are routed to their destination neighborhoods (e.g., FIG. 4 at 412). Global Positioning System (GPS) (e.g., FIG. 4 at 410) is used to track the locations of the trucks in real-time.

At 104, a set of drones is dispatched with the delivery trucks. For example, the delivery trucks that are routed to their destination also carry a set of drones (e.g., FIG. 4 at 408a, 408b, 408c, 408d, 408n). In one embodiment, the trucks and the drones are dispatched from the origin or the last dropoff point of one or more of the packages. In one embodiment, the trucks are dispatched to a location considering the final destinations of the packages the trucks are transporting, with last hop delivery to be completed by one or more of the drones. A dropoff location (where a delivery truck is destined and from where a drone takes off to make a delivery to a final destination of a package) may be determined by an optimization algorithm, which may take into account available parking, road conditions (e.g., one-way streets, stop lights, construction, and/or other conditions) relative to line-of-sight (approximate drone path), available battery life of one or more of the drones, available gas (or another source of energy) in the delivery truck, optimized tradeoff between fuel and speed of delivery, the relative adjacency of packaged final delivery points (e.g., is there a reasonable location for the delivery truck to stop such that drones can handle delivery of multiple packages), and any other factor deemed useful by a delivery organization.

In one embodiment, assignment of delivery trucks to drone takeoff locations is based on identification of optimal truck delivery points. One of several clustering techniques may be applied to identify optimal dropoff points, for example, two-dimensional (2D) spatial clustering on GPS coordinates of package destination location. In one aspect, this optimization differs from the established Vehicle Routing Problem as there are no pre-defined locations which must be visited; the value of routing a vehicle to any particular location is a function of its impact on the reward function of an optimization in assigning packages to drones.

One or more of various known optimization methods may be employed to implement an optimization for determining the location a delivery truck is to be routed to, also a dropoff point for a drone. For example, Spectral Clustering, clustering by Modularity Maximization, or other methods of geographic location clustering can be used to find initial truck delivery points. From these points, a local neighborhood search can be used to identify actual locations, for example, where the truck could park (e.g., waiting for drones to perform the final delivery). Alternatively, the entire optimization may be expressed as a Linear Program, incorporating weights to tradeoff several factors (fuel efficiency, delivery speed, manpower required to manage the drones, and/or others). Linear programs may be solved efficiently using off-the shelf software, such as IBM CPLEX from International Business Machines Corporation, Armonk, N.Y.

At 106, a schedule unit, for example, a hardware processor executing or running a schedule code computes a delivery schedule for packages. In one embodiment, an optimization problem is formulated and solved to generate a package delivery schedule. The package delivery as scheduled provides efficiency in delivery, for example, in terms of time, number of vehicles, and power source such as electricity and/or fuel.

In one embodiment, assignment of packages to drones may be based on the following algorithm. The method, for example, may assign packages to drones by solving an optimization problem in which the method maximizes the number of packages delivered by the drones given a finite battery capacity and constraints on the cargo capacity and weight limitations of the drones. The specific constraints in the optimization problem include: a package can only be delivered one time by one drone; the weight of a package must not exceed the capacity of the drone; for a single drone, the combined distance from the truck to the first delivery plus the distance between each delivery, must not exceed the battery life of the drone subject to current wind conditions.

The schedule optimization in one embodiment includes local weather conditions, for example, wind speed and wind direction, in computing the cost for a drone making a package delivery.

The optimization may be encoded and solved in the following mathematical formulation. The formulation has a standard translation into a compatible Integer Program, which is solvable using IBM CPLEX from International Business Machines Corporation, Armonk, N.Y., or similar optimization toolkits.

Let D be the set of drones. D is given and represents the drones that are to be dispatched to deliver a package from a routed truck to a destination. In one embodiment, D is a fixed number, for example, the set of drones available for use in delivery is fixed. The optimization uses D value in mapping drones to packages. Each drone in D may have a unique Capacity value. A drone is mapped to a package with weight at or below this Capacity value. For example, consider that there are 3 drones d in D, d0, d1, and d2 with capacities of 15 pounds (lbs.), 25 lbs. and 50 lbs., respectively. A package weighing 23 lbs. can only be carried by d1 and d2 in this set of drones.

Let P be the set of packages for delivery. P is given and represents packages transported in one or more delivery trucks, which are to be delivered to respective destinations by a drone in set D.

Let Destination(p) be the geographical destination of package p. Destination(p) is given and represents a destination for a package p, for instance, an address of a home or office or another. Destination(p) may be represented by a latitude and longitude value. Distance may be computed as line of sight distance. In another embodiment, the notion of "distance" may be extended to capture several other conditions, such as prevailing headwinds, and interpreted as energy (battery life) to be consumed or time required for delivery. Each of these (or other optimization "distance" metrics) may be valid for the optimization, leading to appropriate solutions, depending on the metric of interest.

Let Weight(p) be the weight of package p. Weight(p) is given and represents a weight factor given to a package p being delivered to its destination.

Let Capacity(d) be the maximum weight capacity of drone d. Capacity(d) is given and represents the maximum weight of a package that a drone can carry for delivery.

Let Range(d) be the maximum distance range (battery life) of drone d. Range(d) is given and represents the maximum distance a drone can travel with a package given its power source, for example, battery life.

Let Start(d) be the geographical starting point for drone d. Start(d) is given and represents a geographic location or point from where a drone is dispatched with an assigned package to deliver the package to a destination. Start(d) is determined by the optimization on delivery truck dispatch locations. Start(d) is equivalent to a dropoff location. The drone leaves from the location of the truck. Start(d) may be represented by latitude and longitude value or another value, for example, consistent with consistent with other values used for representing geographic point in the optimization.

Let End(d) be the geographical ending point for drone d. End(d) is given and represents a geographic location or point where the drone returns after its assigned delivery. End(d) is the return location of the drone after all deliveries (in a single flight) are complete. This is likely the same as Start(d), but may be different if the delivery truck moves while drones are in flights (e.g., circling the block if no parking is available). As in the case of Start(d), End(d) is determined by optimization on delivery truck rendezvous locations. End(d) may be represented by a latitude and longitude value or another value, for example, consistent with other values used for representing geographic point in the optimization.

Let $w_p$ be the weighted value of delivery for package p. $w_p$ is given and represents a weight factor given to a package p being delivered to its destination. $w_p$ represents the "value" of the package being delivered. In some cases, it might not be possible to delivery all packages. This weight value preferences some packages being delivered over others. The weight values may be defined or configured, for example, by a delivery organization, a delivery customer, or another interested party.

Consider A(d, p)=1 means that drone d will deliver package p.

Consider A(d, p)=0 means that drone d will not deliver package p. A(d,p) are decision variables to be solved by an optimization function.

Maximize:

$$\Sigma_{\forall d \in D, p \in P} w_p \cdot A(d,p) \quad \text{Equation (1)}$$

Subject to:
A(d, p)∈{0,1}
$\forall d_0, d_1 \in D, p \in P: A(d_o,p)=1 \Rightarrow A(d_1,p)=0$;
$\forall d \in D, p \in P: A(d,p)=1 \Rightarrow$ Capacity (d)≥Weight (p);
$\forall d \in D$: Let K={$\forall p \in P | A(d.p)=1$}s. t. ∃ Permutation(K)|

$$\text{Distance}(\text{Start}(d), k_0) + \Sigma_{i \in 1 \ldots |K|-2} \text{Distance}(k_i, k_{i+1}) + \text{Distance}(k_{|K|-1}, \text{End}(d)) \leq \text{Range}(d)$$

K is a variable used in the optimization to solve for the delivery order of packages. Once the optimization is complete, K specifies the exact plan of this order. Lower case k represents each stop along a given drone's delivery assignment of a package. K is a decision variable in the optimization.

Start(d) and End(d) are the delivery truck (vehicle) locations in the beginning and end of a delivery sequence. In one embodiment, these values are given in this optimization. The values, for example, may be determined based on another optimization, for example, that determines the delivery truck route location (also referred to above as a dropoff point), for example, for each truck being considered. In this drone to package optimization formulation (Equation (1)), Start(d) and End(d) are known as constants, for example, a fixed predefined location (latitude/longitude) determined previously by the optimization on truck dropoff points. In another aspect, another formulation may be considered that include dynamic modeling.

The optimization formulation of Equation (1) works with any number of trucks. Packages in different trucks are accounted by their corresponding values of Start and End. In one embodiment, drones in the same truck share the same values of Start and End.

It may not be possible to assign all packages with one run of the optimization. The weight values prioritize the important packages to the first round or iteration. Later rounds of optimization may be introduced until all packages are delivered. For example, optimization algorithm that assigns drones to packages may be re-executed iteratively, for example, after a round of delivery. Re-executions of the optimization algorithm and dispatching of the drones may iterate until all packages are delivered.

The decision variable A(d, p) specifies that a particular drone d will carry package p. Another decision variable includes a plan found as a permutation of K.

Referring to FIG. 1, at 108, the drones are dispatched with respective assigned packages from respective vehicles (from respective dropoff points/locations) transporting the respective assigned packages. For example, the drones are controlled to fly to a delivery destination to deliver an assigned package.

At 110, the current locations of the delivery trucks are compared with those produced from the schedule. In case of a discrepancy of a driver from their expected location, drivers are given instructions for whether they should speed up or slow down, for example, so that a drone can catch up to the truck for a rendezvous, for example, at the specified End(d) location. Generally, for example, based on determining the time the drone is to arrive at the rendezvous point (return location in the schedule (End(d)) and the current location of the truck, speed for the truck may be computed so that the truck arrives at the rendezvous point at the same or substantially same time (e.g., within a threshold range of time) as the drone. This may occur, for example, if the delivery truck from where a drone was dispatched could not stay stationary at the dropoff point, but was circling or moving around the area while waiting for the drone to complete its delivery.

In one embodiment, this algorithm may be implemented as follows. Continually, based on the truck's current speed and estimates of distance, traffic, and other conditions that affect the truck's travel time, the truck's estimated time of arrival (ETA) is estimated. This estimation method may be similar to those used in commodity GPS-navigation devices to predict ETA. Similarly, the drones' ETAs to their respective package dropoff destinations and then to the truck may be estimated based on speed, distance, wind condition, and obstacles that must be flown around. If at any point it is expected that the drones will reach the final destination before the truck, the truck may be instructed to speed up. In the converse case that the drones will arrive later than the truck, the driver may chose to slow down—saving fuel or possibly eliminating the need to find parking, for example, presuming drones arrive just in time for the driver to briefly pause and then continue with drones in tow. In the case that the truck is circling a building, neighborhood, or the like, the periodicity of this circling may be estimated in the same way as fixed-destination ETA. Instead of optimizing for arrival at the fixed destination just in time, the optimization may be extended so that the truck completes an integral number of circles, and the drones arrive just in time before the truck would complete one additional loop. For example, this type of extension to the optimization may be implemented for truck's destination known to not have a parking area where the truck can wait for the drones while the drones are making a delivery such that the truck may need to circle around the area.

In one aspect, a truck or like may have a special landing pad for the drone with colors or symbols that the drone can use to discern its position precisely using a computer vision technique. In this instance, the drone is equipped with a downward facing camera. The landing pad may contain hooks or catches such that the drone is securely fastened to the truck after landing. The truck or like may have a retractable roof enabling the drone to land inside of it. The truck may have a long-distance radio antenna, enabling the drone to maintain long-range communications with the truck or like, for example within 3 to 4 miles. The truck and the drone may both be equipped with cell phone chipsets, enabling communication via the Internet, or as a backup to the radio antenna. The truck or like may be equipped with a battery charging station such that each subsequent drone flight is performed with a fully-charged battery. The truck or like may be equipped with multiple drones, such that the logical unit (LU) of a computer communicates with all drones concurrently, and the system contains algorithms for determining an order in which the drones land, for example, so that only one drone lands at one time. In one aspect, these landing algorithms may be similar to those used by Air Traffic Control to control the landing of airplanes. The truck or like may be equipped with an algorithm to recommend speed changes or street turns to allow drones to catch up.

The delivery location, for example, apartment in a building, may have a special delivery box, for example, mounted in the window, for the drone to drop off the package. Some delivery locations may also have a special platform for the drone to land in case the drone loses communication or the ability to catch up with the delivery truck.

In one embodiment, the system of the present disclosure operates continuously and is able to handle cases where a drone is incapacitated, for example, due to a hardware failure. The schedule optimization in one embodiment includes local weather conditions, for example, wind speed and wind direction, in computing the cost for a drone making a package delivery.

The system and method in one embodiment controls a set of drones and a set of delivery trucks to move of packages, where the number of drones in the set, the number of delivery trucks in the set and the number of packages are not equal. For instance, the sets may not be of equal size, |D|!=|P|!=|T|, where D represents drones, P represents packages, T represents trucks or like.

In one aspect, the trucks or like in the present disclosure do not have pre-defined stop locations. Rather, they are continuously moving. A second class of movable vehicles (drones) take off from those moving vehicles to makes the actual delivery of package to the package's destination, and/or land to make a pick up and/or recharge.

Figure 2:
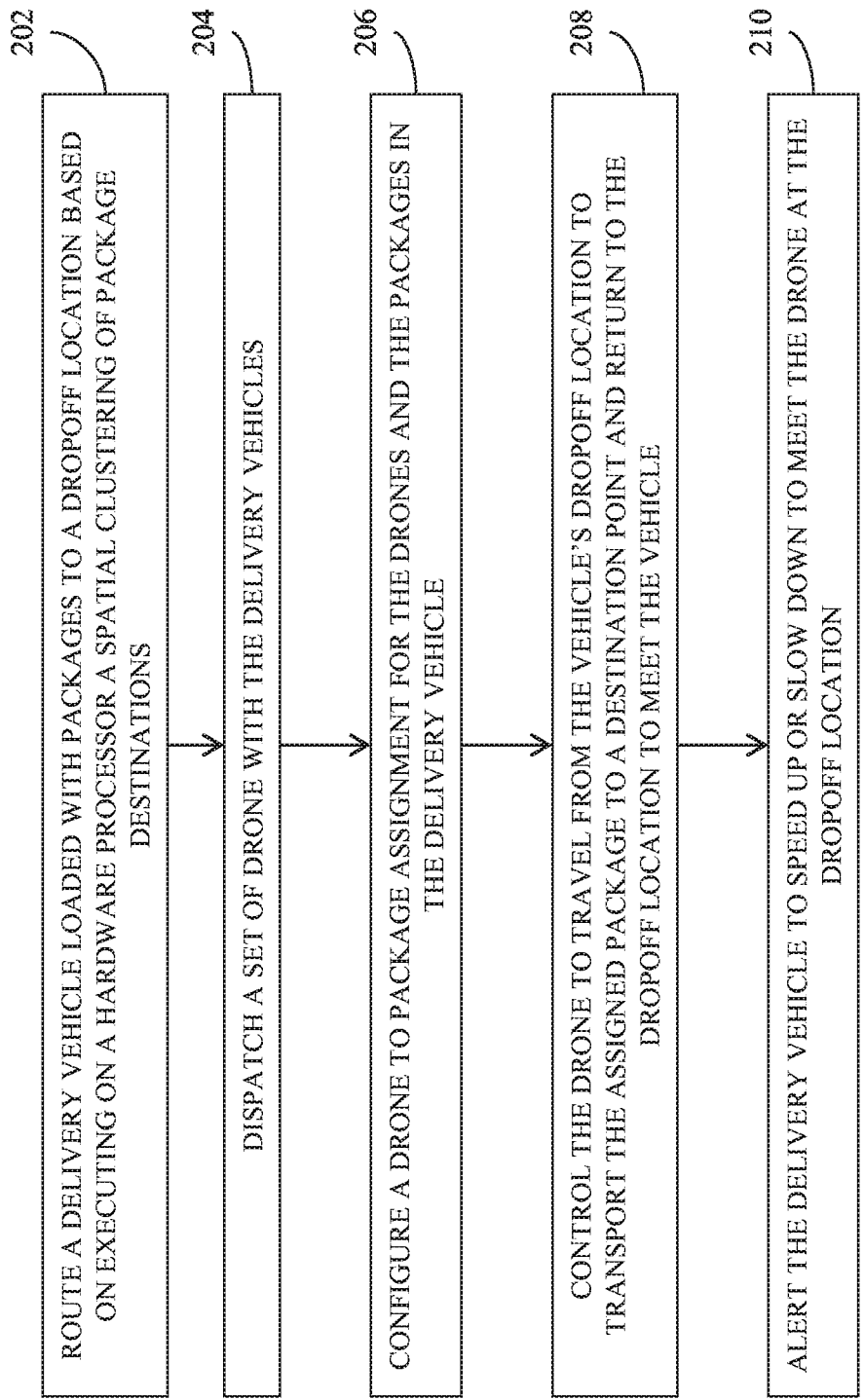
FIG. 2 is a diagram illustrating another aspect of a method of controlling drones and vehicles in package delivery, in one embodiment of the present disclosure.

FIG. 2 is a diagram illustrating another aspect of a method of controlling drones and vehicles in package delivery, in one embodiment of the present disclosure. At 202, the method may include routing a delivery vehicle loaded with packages to a destination area based on executing on a hardware processor a spatial clustering of package destinations. The destination area may be in the neighborhood or vicinity of the package destinations, for example, within a threshold distance from a destination address where a package is to be delivered. The destination area, for example, is the dropoff location for drones carried by the delivery vehicle. For instance, consider a delivery to be made to a building in a city where parking is not available. A delivery truck may circle the building one time while a drone takes off, flies to a dropoff point, and returns to the delivery truck in time as the truck completes its circle.

At 204, a set of drones are also dispatched with the delivery vehicle.

At 206, a drone-to-package assignment may be configured for the drones that are dispatched and the packages in the delivery vehicle heading to the destination area. The assignment may be performed by solving an optimization problem (for example, as described above) that maximizes a number of the packages delivered by the drones subject to a plurality of constraints comprising at least that: a given package can only be delivered one time by one drone; weight of the given package must not exceed capacity of the drone; and for a single drone, a combined distance from the delivery vehicle to a first delivery plus a distance between each delivery, must not exceed a battery life of the drone subject to current wind conditions in drone's delivery path.

At 208, the method may include controlling the drone to travel (e.g., fly) from the vehicle's dropoff location to transport the assigned package to a destination point and return to the dropoff location to meet the vehicle.

At 210, the method may include alerting or controlling the delivery vehicle to speed up or slow down to meet the drone at the return location, for example, without the delivery vehicle having to stop and wait at the return location.

Figure 3:
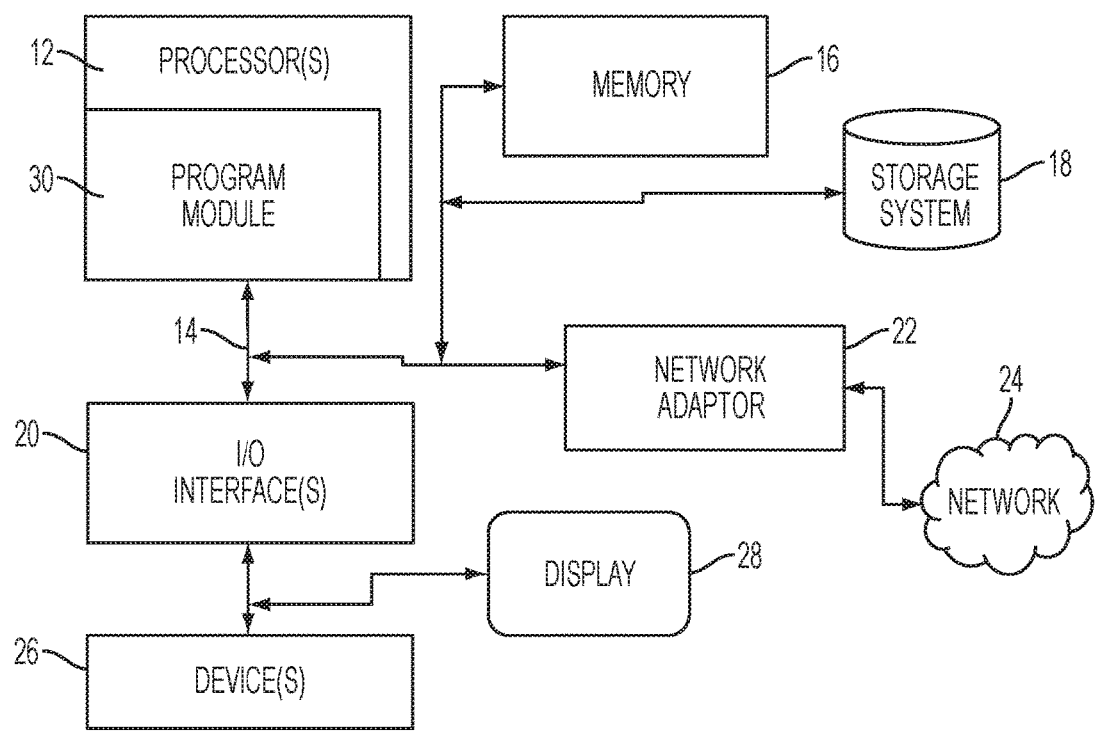
FIG. 3 illustrates a schematic of an example computer or processing system that may implement a system that assigns and dispatches drones in one embodiment of the present disclosure.

FIG. 3 illustrates a schematic of an example computer or processing system that may implement a system that assigns and dispatches drones in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of controlling drones and vehicles in package delivery, comprising:
routing a delivery vehicle loaded with drones and packages to a dropoff location based on executing on a hardware processor a spatial clustering of package destinations;
configuring a drone to package assignment for the drones in the vehicle and the packages in the delivery vehicle, the configuring performed based on executing on the hardware processor an optimization function that maximizes a number of the packages delivered by the drones subject to a plurality of constraints, the optimization function given as input at least the dropoff location and the plurality of constraints,
the plurality of constraints comprising:
at least that a given package can only be delivered one time by one drone,
that weight of the given package must not exceed capacity of the drone, and
that for a single drone, a combined distance from the delivery vehicle to a first delivery plus a distance between each delivery, must not exceed a battery life of the drone subject to current wind conditions in drone's delivery path, wherein the optimization function comprises maximizing $\Sigma_{\forall d \in D, p \in P} w_p \cdot A(d,p)$,
subject to:
$A(d, p) \in \{0,1\}$
$\forall d_0, d_1 \in D, p \in P : A(d_o,p)=1 \Rightarrow A(d_1,p)=0$;
$\forall d \in D, p \in P: A(d,p)=1 \Rightarrow Capacity(d) \geq Weight(p)$; and
$\forall d \in D$: Let $K=\{\forall p \in P | A(d,p)=1\}$ s. t. $\exists$ Permuation(K)|

$$Distance(Start(d),k_0)+\Sigma_{i \in 1 \ldots |K|-2} Distance(k_i,k_{i+1})+ Distance(k_{|K|-1},End(d)) \leq Range(d),$$

wherein D represents a set of the drones,
P represents a set of the packages,
$w_p$ represents a weight factor given to a package p being delivered to its destination,
Weight(p) represents a weight given to a package p,
Capacity(d) represents the maximum weight of a package that a drone can carry for delivery,
Range(d) represents a maximum distance a drone can travel based on a power source of the drone,
Start(d) represents a geographic location from where a drone is dispatched,
End(d) represents a geographic location where the drone returns after completing delivery of a package,
A(d, p)=1 represents that drone d will deliver package,
A(d, p)=0 represents that drone d will not deliver package p,
K represents a delivery order of packages,
k represents each stop along a drone's delivery assignment of a package,
wherein A(d,p) and K are decision variables solved in the optimization function; and
controlling the drone to travel from the dropoff location to transport the assigned package to a destination point and return to the dropoff location to meet the vehicle.

2. The method of claim 1, further comprising controlling the delivery vehicle to speed up or slow down to meet the drone at the dropoff location without the delivery vehicle having to stop and wait at the dropoff location while the drone is making a delivery.

3. The method of claim 2, wherein the controlling the delivery vehicle further comprises tracking a current position of the delivery vehicle via a global positioning system.

4. The method of claim 1, wherein the delivery vehicles comprises a plurality of delivery vehicles each carrying a set of packages and a set of drones for assignment.

5. The method of claim 4, wherein the plurality of delivery vehicles have different dropoff locations from one another for dispatching and meeting with the set of drones.

6. The method of claim 1, wherein the optimization problem further outputs an assignment of delivery path comprising multiple delivery stops for the drone.

7. The method of claim 1, wherein the configuring a drone to package assignment and controlling the drone to travel from the dropoff location to transport the assigned package to a destination point and return to the dropoff location to meet the vehicle are repeated until all packages in the delivery vehicle are assigned for delivery.

8. A computer readable storage device storing a program of instructions executable by a machine to perform a method of controlling drones and vehicles in package delivery, the method comprising:
routing a delivery vehicle loaded with drones and packages to a dropoff location based on executing on a hardware processor a spatial clustering of package destinations;
configuring a drone to package assignment for the drones in the vehicle and the packages in the delivery vehicle, the configuring performed based on executing on the hardware processor an optimization function that maximizes a number of the packages delivered by the drones subject to a plurality of constraints, the optimization function given as input at least the dropoff location, the plurality of constraints comprising:
at least that a given package can only be delivered one time by one drone,
that weight of the given package must not exceed capacity of the drone, and
that for a single drone, a combined distance from the delivery vehicle to a first delivery plus a distance between each delivery, must not exceed a battery life of the drone subject to current wind conditions in drone's delivery path, wherein the optimization function comprises maximizing $\Sigma_{\forall d \in D, p \in P} w_p \cdot A(d,p)$,
subject to:
$A(d,p) \in \{0,1\}$
$\forall d_0, d_1 \in D, p \in P: A(d_0,p)=1 \Rightarrow A(d_1,p)=0;$
$\forall d \in D, p \in P: A(d,p)=1 \Rightarrow$ Capacity $(d) \geq$ Weight $(p)$; and
$\forall d \in D:$ Let $K=\{\forall p \in P | A(d,p)=1\}$ s. t. $\exists$ Permutation(K)|

$$\text{Distance}(\text{Start}(d), k_0) + \Sigma_{i \in 1 \ldots |K|-2}\text{Distance}(k_i, k_{i+1}) + \text{Distance}(k_{|K|-1}, \text{End}(d)) \leq \text{Range}(d),$$

wherein D represents a set of the drones,
P represents a set of the packages,
$w_p$ represents a weight factor given to a package p being delivered to its destination,
Weight(p) represents a weight given to a package p,
Capacity(d) represents the maximum weight of a package that a drone can carry for delivery,
Range(d) represents a maximum distance a drone can travel based on a power source of the drone,
Start(d) represents a geographic location from where a drone is dispatched,
End(d) represents a geographic location where the drone returns after completing delivery of a package,
A(d, p)=1 represents that drone d will deliver package, A(d, p)=0 represents that drone d will not deliver package p,
K represents a delivery order of packages,
k represents each stop along a drone's delivery assignment of a package,
wherein A(d,p) and K are decision variables solved in the optimization function; and
controlling the drone to travel from the dropoff location to transport the assigned package to a destination point and return to the dropoff location to meet the vehicle.

9. The computer readable storage device of claim 8, further comprising controlling the delivery vehicle to speed up or slow down to meet the drone at the dropoff location without the delivery vehicle having to stop and wait at the dropoff location while the drone is making a delivery.

10. The computer readable storage device of claim 9, wherein the controlling the delivery vehicle further comprises tracking a current position of the delivery vehicle via a global positioning system.

11. The computer readable storage device of claim 8, wherein the delivery vehicles comprises a plurality of delivery vehicles each carrying a set of packages and a set of drones for assignment.

12. The computer readable storage device of claim 11, wherein the plurality of delivery vehicles have different dropoff locations from one another for dispatching and meeting with the set of drones.

13. The computer readable storage device of claim 8, wherein the configuring a drone to package assignment and controlling the drone to travel from the dropoff location to transport the assigned package to a destination point and return to the dropoff location to meet the vehicle are repeated until all packages in the delivery vehicle are assigned for delivery.

14. A system of controlling drones and vehicles in package delivery, comprising:
a hardware processor operable to control routing of a delivery vehicle loaded with drones and packages to a dropoff location based on executing a spatial clustering of package destinations;
the hardware processor operable to configure a drone to package assignment for the drones and the packages in the delivery vehicle, the configuring performed based on executing on the hardware processor an optimization function that maximizes a number of the packages delivered by the drones subject to a plurality of constraints, the optimization function given as input at least the dropoff location and the plurality of constraints,
the plurality of constraints comprising:
at least that a given package can only be delivered one time by one drone,
that weight of the given package must not exceed capacity of the drone, and
that for a single drone, a combined distance from the delivery vehicle to a first delivery plus a distance between each delivery, must not exceed a battery life of the drone subject to current wind conditions in drone's delivery path, wherein the optimization function comprises maximizing $\Sigma_{\forall d \in D, p \in P} w_p \cdot A(d,p)$,
subject to:
$A(d,p) \in \{0,1\}$
$\forall d_0, d_1 \in D, p \in P: A(d_0,p)=1 \Rightarrow A(d_1,p)=0;$
$\forall d \in D, p \in P: A(d,p)=1 \Rightarrow$ Capacity $(d) \geq$ Weight $(p)$; and
$\forall d \in D:$ Let $K=\{\forall p \in P | A(d,p)=1\}$ s. t. $\exists$ Permutation(K)|

$$\text{Distance}(\text{Start}(d), k_0) + \Sigma_{i \in 1 \ldots |K|-2}\text{Distance}(k_i, k_{i+1}) + \text{Distance}(k_{|K|-1}, \text{End}(d)) \leq \text{Range}(d),$$

wherein D represents a set of the drones,

P represents a set of the packages, $w_p$ represents a weight factor given to a package p being delivered to its destination, Weight(p) represents a weight given to a package p, Capacity(d) represents the maximum weight of a package that a drone can carry for delivery, Range(d) represents a maximum distance a drone can travel based on a power source of the drone, Start(d) represents a geographic location from where a drone is dispatched, End(d) represents a geographic location where the drone returns after completing delivery of a package, A(d, p)=1 represents that drone d will deliver package, A(d, p)=0 represents that drone d will not deliver package p, K represents a delivery order of packages, k represents each stop along a drone's delivery assignment of a package, wherein A(d,p) and K are decision variables solved in the optimization function; and the hardware processor operable to control a drone to travel from the dropoff location to transport the assigned package to a destination point and return to the dropoff location to meet the vehicle.

15. The system of claim 14, wherein the hardware processor controls the delivery vehicle to speed up or slow down to meet the drone at the dropoff location without the delivery vehicle having to stop and wait at the dropoff location while the drone is making a delivery.

16. The system of claim 15, wherein the hardware processor further tracks a current position of the delivery vehicle via a global positioning system to control the delivery vehicle.

17. The system of claim 14, wherein the delivery vehicles comprises a plurality of delivery vehicles each carrying a set of packages and a set of drones for assignment.

18. The system of claim 17, wherein the plurality of delivery vehicles have different dropoff locations.

19. The system of claim 14, wherein the delivery vehicles is equipped with a landing pad for allowing the drone to land on the delivery vehicle while the delivery vehicle is moving.

20. The system of claim 14, wherein the hardware processor repeats configuring a drone to package assignment and controlling the drone to travel from the dropoff location to transport the assigned package to a destination point and return to the dropoff location to meet the vehicle until all packages in the delivery vehicle are assigned for delivery.

* * * * *